(12) United States Patent
Hua et al.

(10) Patent No.: US 12,143,729 B2
(45) Date of Patent: Nov. 12, 2024

(54) HIGH PRECISION COLOR PROCESSING FOR WIDE DYNAMIC RANGE SENSORS

(71) Applicant: Texas Instruments Incorporated, Dallas, TX (US)

(72) Inventors: Gang Hua, Katy, TX (US); Mihir Narendra Mody, Bengaluru (IN); Niraj Nandan, Plano, TX (US); Shashank Dabral, Allen, TX (US); Rajasekhar Reddy Allu, Plano, TX (US); Denis Roland Beaudoin, Rowlett, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/538,833

(22) Filed: Nov. 30, 2021

(65) Prior Publication Data
US 2023/0171512 A1 Jun. 1, 2023

(51) Int. Cl.
*H04N 23/84* (2023.01)
*H04N 9/67* (2023.01)
*H04N 9/68* (2023.01)
(52) U.S. Cl.
CPC ............. *H04N 23/843* (2023.01); *H04N 9/67* (2013.01); *H04N 9/68* (2013.01)

(58) Field of Classification Search
CPC ......... H04N 9/04515; H04N 9/67; H04N 9/68
See application file for complete search history.

(56) References Cited

U.S. PATENT DOCUMENTS

2021/0377549 A1* 12/2021 Ferrara .................. H04N 19/98
2022/0174249 A1* 6/2022 Hua ........................ H04N 23/88

* cited by examiner

*Primary Examiner* — Twyler L Haskins
*Assistant Examiner* — Fayez A Bhuiyan
(74) *Attorney, Agent, or Firm* — Xianghui Huang; Frank D. Cimino

(57) ABSTRACT

A technique for image processing, comprising: receiving input image data, wherein the image data is companded into a first bit depth, wherein the image data includes incomplete color values for pixels of the image data, and wherein the image data is associated with a first color space, interpolating the image data to generate color values for the incomplete color values for pixels of the image data, expanding the image data from the first bit depth to a second bit depth, wherein the color values of the expanded image data have a linear dynamic range, and wherein the second bit depth is higher than the first bit depth, converting the color values for pixels of the expanded image data from the first color space to a second color space, and compressing the color values for pixels of the image data to a third bit depth, the third bit depth lower than the second bit depth, and wherein the compressed color values have a nonlinear dynamic range.

20 Claims, 3 Drawing Sheets

HIGH PRECISION COLOR PROCESSING FOR WIDE DYNAMIC RANGE SENSORS

BACKGROUND

In digital imaging, an image sensor includes a large number of pixels, each of which can generate color values and brightness information for light detected by the pixel. This pixel data may be received and processed by an image processor. Generally, the image processor may process the image data from the sensor to generate color information, perform demosaicing, noise reduction, color correction, filtering, data formatting, etc.

Improvements to image sensors have allowed image sensors to become more sensitive to light. As an example, a dynamic range of pixels of the image sensor have increased, allowing for increases in a bit depth of the image data from the sensor. The increased bit depth is useful for high dynamic range (HDR) (e.g., wide dynamic range) images, which have an expanded dynamic range as compared to non-HDR (e.g., traditional 12-bit) images. The expanded dynamic range may be accommodated by an increased bit depth, which increases the number of values available to represent the image data from pixels of the image sensor. This increased bit depth may increase processing loads for the image processor, and techniques to help increase the performance of the image processor while minimizing cost and space used by the image processor may be useful.

SUMMARY

This disclosure relates to a technique for image processing, comprising: receiving input image data, wherein the image data is companded into a first bit depth, wherein the image data includes incomplete color values for pixels of the image data, and wherein the image data is associated with a first color space. The technique also includes interpolating the image data to generate color values for the incomplete color values for pixels of the image data. The technique further includes expanding the image data from the first bit depth to a second bit depth, wherein the color values of the expanded image data have a linear dynamic range, and wherein the second bit depth is higher than the first bit depth. The technique also includes converting the color values for pixels of the expanded image data from the first color space to a second color space and compressing the color values for pixels of the image data to a third bit depth, the third bit depth lower than the second bit depth, and wherein the compressed color values have a nonlinear dynamic range.

Another aspect of the present disclosure relates to an image processing pipeline, including a front end module for receiving image data, wherein the image data is companded into a first bit depth, wherein the image data includes incomplete color values for pixels of the image data, and wherein the image data is associated with a first color space and a color processing module, and a demosaicing module. The demosaicing module is configured to interpolate the image data to generate color values for the incomplete color values for pixels of the image data. The demosaicing module is also configured to expand the image data from the first bit depth to a second bit depth, wherein the color values of the expanded image data have a linear dynamic range, and wherein the second bit depth is higher than the first bit depth. The demosaicing module is further configured to convert the color values for pixels of the expanded image data from the first color space to a second color space and compress the color values for pixels of the image data to a third bit depth, the third bit depth lower than the second bit depth, and wherein the compressed color values have a nonlinear dynamic range.

Another aspect of the present disclosure relates to a non-transitory program storage device comprising instructions stored thereon. The instructions cause one or more processors to receive input image data, wherein the image data is companded into a first bit depth, wherein the image data includes incomplete color values for pixels of the image data, and wherein the image data is associated with a first color space. The instructions further cause the one or more processors to interpolate the image data to generate color values for the incomplete color values for pixels of the image data. The instructions also cause the one or more processors to expand the image data from the first bit depth to a second bit depth, wherein the color values of the expanded image data have a linear dynamic range, and wherein the second bit depth is higher than the first bit depth. The instructions further cause the one or more processors to convert the color values for pixels of the expanded image data from the first color space to a second color space and compress the color values for pixels of the image data to a third bit depth, the third bit depth lower than the second bit depth, and wherein the compressed color values have a nonlinear dynamic range.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

Figure 1:
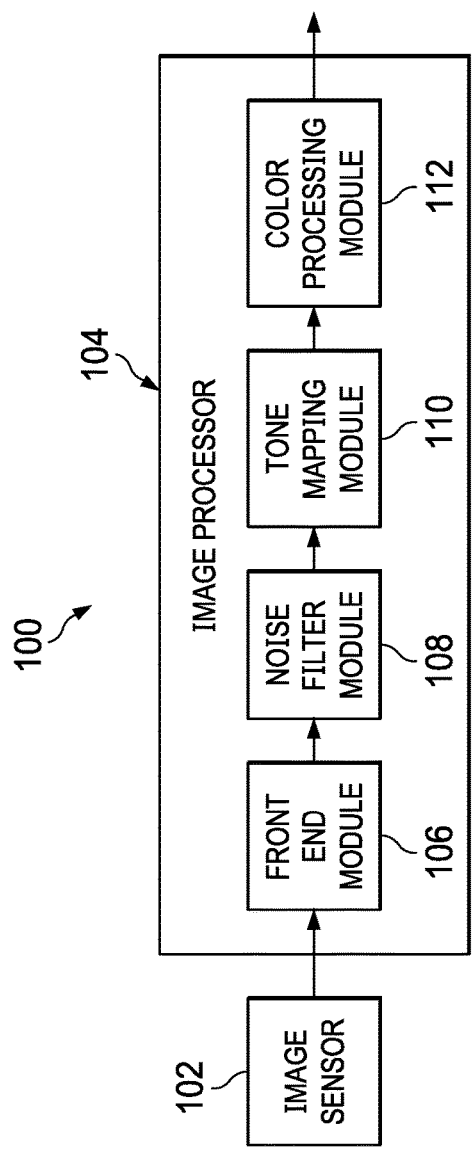
FIG. 1 is a block diagram illustrating an overview of an image processing pipeline, in accordance with aspects of the present disclosure.

FIG. 1 is a block diagram 100 illustrating an overview of an image processing pipeline, in accordance with aspects of the present disclosure. As shown, an image sensor 102 may capture image information at a certain bit depth, such as 24 bits. The image sensor 102 may include sets of pixels which are sensitive to certain colors of light. In some cases, the pixels may be sensitive to three or four colors and grouped into color channels. These pixels may sense an intensity of light in a certain color and generate a value based on the intensity of light sensed. That is, the pixels may be sensitive to/respond to a certain spectrum of light. The bit depth defines a number of values that can be sensed and/or reported by the image sensor 102. As an example, each pixel of a 24-bit image sensor may be able to describe ~16 million levels (e.g., brightness) of a color of light as compared to a pixel of a 12-bit image sensor, which may be able to describe 4096 levels of the color of light. This increased bit depth helps allows for a greater dynamic range to be described and also helps increase a supported contrast ratio for the image sensor 102. The image sensor 102 may assemble pixel values into image data, for example, by scanning each pixel line by line and passing this generated image data to an image processor 104.

The pixels of the image sensor 102 may have a color filter array, which allows each pixel to measure one color of light, such as red, blue, green, infrared, etc. The color filter array may also include clear regions which cause an associated pixel to measure luminance. The sensitivity of the pixels, colors supported, and levels of color that the pixels can detect and encode (e.g., bit depth) may define a color space of the image sensor 102. The pixels may capture light based on a linear dynamic range where the color value of the light captured by the pixel varies linearly (e.g., the pixel response to light is linear) across the range of color values that the pixel is sensitive to.

In some cases, the image sensor 102 may compand the image data, compressing the image data with a larger bit depth (e.g., dynamic range) to fit within a smaller bit depth for transmission to the image processor 104. For example, the image sensor 102 may compand a 24-bit signal from the pixels for output as a 16-bit signal to the image processor 104. This companding process may convert image data from the pixel of the image sensor, which has a linear dynamic range, to raw image data with a nonlinear dynamic range.

A front end module 106 of the image processor 104 may receive the image data from the image sensor 102, convert this raw image data to a more convenient format such as a gamma or log compressed format, and perform some aspects of image correction such as gamma correction, lens shading correction, white point adjustment, etc. As an example, the image sensor 102 may provide a companded signal and the front end module 106 may convert this companded signal to a format that is more easily handled by components of the image processor 104. The front end module 106 may also perform gamma correction. The image data may include luminance data as well as color information, and gamma correction may apply this luminance data to the color information and correct issues such as lens shading, white point adjustment, etc. The front end module 106 may be coupled to a noise filter module 108, and the front end module 106 may output image data to the noise filter module 108. The noise filter module 108 may apply one or more noise filters to reduce noise in the image data. The noise filter module 108 may be coupled to a tone mapping module 110, and the noise filter module 108 may output the filtered image data to the tone mapping module 110.

The tone mapping module 110 helps adjust the dynamic range of the image data for display in a medium, such as a monitor, which may support a dynamic range less than that supported by the image data. For example, a 16-bit image data from the image sensor 102 may have a linear dynamic range, and this image data may be converted into a 12-bit image data with a nonlinear dynamic range by the tone mapping module. This converted image data may then be passed to a color processing module 112 for demosaicing and color conversion.

Higher bit signals, such as for generating HDR images, may have a linear dynamic range such that the color light level measured by a pixel is proportional to the pixel value in the image data. Converting such higher bit, linear dynamic range image data to a lower bit depth image data with a nonlinear dynamic range via tone mapping prior to performing other processing, such as demosaicing, may result in compromised color reproduction, for example, for machine learning and machine vision applications. In some cases, the filtered image data output from the noise filter module 108 may be input to the color processing module 112 without tone mapping by the tone mapping module 110. Bypassing the tone mapping module 110 and/or adapting the tone mapping module 110 to generate higher bit depth tone mapped output would increase the bit depth of the image data passed to the color processing module 112. In some cases, color processing modules 112 configured to handle 12-bit image data may be adapted to handle higher bit depth image data and process color image data with a linear dynamic range without adapting the entire color processing module 112 to handle higher bit depth image data.

Figure 2:
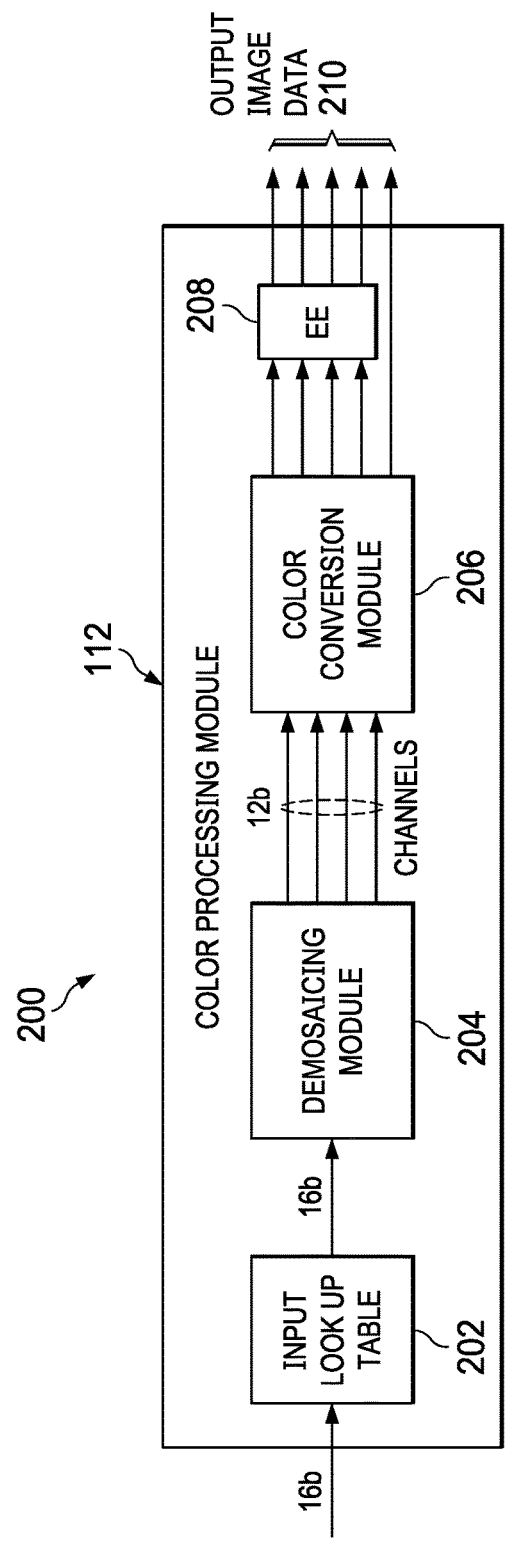
FIG. 2 is a block diagram illustrating aspects of a color processing module, in accordance with aspects of the present disclosure.

FIG. 2 is a block diagram 200 illustrating aspects of a color processing module 112, in accordance with aspects of the present disclosure. As shown, the color processing module 112 includes a data path for processing the image data. In this example, data path of the color processing module 112 includes an input lookup table 202, which may receive the image data input into the color processing module 112. The input lookup table 202 may help adjust the color format to a format that is expected by the other components of the color processing module 112. In this example, the input lookup table 202 is configured to receive 16-bit image data and output 16-bit image data. The input lookup table 202 may output to a demosaicing module 204.

The demosaicing module 204 may generate color values for pixels of the image data that were not captured (e.g., the color values of pixels of the image data are incomplete), for example, due to the structure of the image sensor. The demosaicing module 204 is discussed further below. The demosaicing module 204 may then output values for each color channel for each pixel. For example, for a particular pixel, the demosaicing module 204 may output a red value, green value, blue value, and the luminance value. In this example, the demosaicing module 204 may be configured to receive 16-bit image data with a linear dynamic range and output 12-bit image data with a nonlinear dynamic range. The demosaicing module 204 may output image data to a color conversion module 206.

The color conversion module 206 may convert the color space from a color space as seen by the image sensor to a reference color space. For example, a imaging sensor may capture light differently as compared to a human eye, and the color conversion module 206 may translate the colors as captured by the imaging sensor into a color space that is more natural for the human eye. Similarly, the color conversion module 206 may be configured to translate the colors captured by the imagining sensor into a color space excepted for a machine vision algorithm. In some cases, the transformations applied by the color conversion module 206 may be configured, for example, by users of the image processor (e.g., a manufacturer/designer using an image processor with a certain image sensor) to tailor the output. In this example, as the demosaicing module 204 is configured to output 12-bit image data, the color conversion module 206 may be configured in a manner similar to existing 12-bit color conversion modules 206. In some cases, the color conversion module 206 may be configured to directly output one or more color channels. The color conversion module 206 may also be configured to output to an edge enhancement (EE) module 208. The EE module may be configured to enhance edge contrast to help sharpen and remove noise from the image data. In some cases, the EE module 208 may be configured to operate in a manner similar to existing 12-bit EE modules 208. The EE module 208 may generate an output image data 210. The output image data 210 may be in any image format. In some cases, the EE module 208 may be configured to output image data in various formats. For example, the EE module 208 may be configured to output multiple color channels and/or modify the color channel data for various formats. The bit depth of the image data may be the same as or less than the bit depth of the image data input to the EE module 208. In this example, the output image data 210 may be up to 12-bit.

Figure 3:
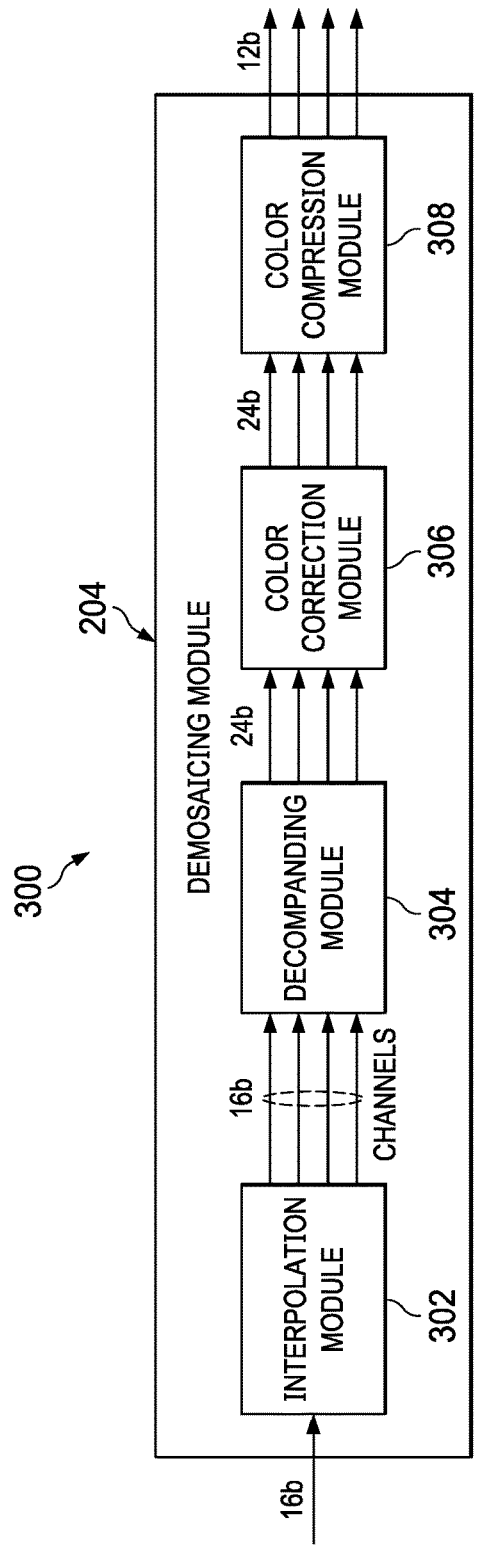
FIG. 3 is a block diagram illustrating a data flow of a demosaicing module, in accordance with aspects of the present disclosure.

In some cases, a 12-bit color processing module 112 may be configured to support higher bit depths, such as 24-bit image data, and perform color correction on image data with a linear dynamic range, primarily by adapting the demosaicing module 204 handle higher bit depth image data. FIG. 3 is a block diagram 300 illustrating a data flow of a demosaicing module 204, in accordance with aspects of the present disclosure. As shown, image data input to the demosaicing module 204 may be received by an interpolation module 302. The interpolation module 302 may be similar to existing 12-bit interpolation modules but configured to support an additional four bits of precision (e.g., 16-bit image data).

The interpolation module 302 estimates color values pixels of the image data. As an example, an image sensor may have a pixel grid with a color filter array arranged such that each pixel is configured to capture a certain color of light. For example, with an image sensor with a Bayer pattern, a set of four pixels may capture light of different colors with one pixel configured to capture red light, one pixel configured to capture blue light, and two pixels configured to capture green light. Interpolation then fills in color values that are not captured by the pixels based on neighboring pixels that did capture those colors. Thus, during interpolation, a green value and blue value may be filled in for a red pixel based on values from neighboring green and blue pixels. Similarly, green and red values may be filled in for a blue pixel based on values from neighboring green and red values. Any known interpolation technique may be implemented, such as bilinear interpolation, adaptive homogeneity directed interpolation, bicubic interpolation, etc. It may be understood that other image sensor patterns may also be supported. For example, image data captured using a red, clear, clear, blue (RCCB) sensor may also be interpolated by the interpolation module 302.

After interpolation, each pixel may be associated with four values (e.g., channels). For example, where the image sensor pattern includes three color values, after interpolation, each pixel may be associated with three color values (and a luminance value). As another example, an image sensor with four colors in the image sensor pattern may include four color values per pixel, and image sensor patterns with less than three color in the image sensor pattern may be associated with the number of colors in the image sensor pattern plus luminance. Color values corresponding for a certain color for each pixel can be grouped into color channels. For example, a green color channel may include the green color value for each pixel, the red color channel may include the red color values for each pixel and so forth.

In some cases, the interpolation module 302 may also support adjusting a gain and offset for each color channel. For example, the green, red, and blue channels may each be associated with a gain value and an offset value. The offset value may be based on a value range for a color channel. For example, where a color channel supports 256 values, then the offset may be set to the middle of the range, or 128. The gain value may be based on an amplitude range or variance of the values for a color channel. For example, where color values for a color channel have a large range (or variance) the gain may be lowered to help fit the color values into an output range. The gain and offset value may be used for providing an unsigned bipolar color difference signal, for a color channel which indicates a difference between color values for each pixel. For example, the bipolar color difference signal may indicate a difference in value between the red value and the green value for a pixel, a difference between the blue value and green value for a pixel, etc. In such cases, the bipolar color difference signal may include negative values. However, the image processor may support only unsigned values. An offset value may be used to indicate where the zero value is for the unsigned values.

After interpolation, the interpolation module 302 may output multi-channel image data (e.g., three color channels, plus a luminance value channel) to a decompanding module 304. In some cases, the image sensor may compand a higher bit depth signal into a lower bit depth signal for transmission to an image processor. For example, the image sensor may compand a 24-bit signal from the pixels for output as a 16-bit signal to the image processor. The image sensor may sense a higher bit signal with a linear dynamic range. This higher bit signal may be companded into a lower bit image data by compressing the linear dynamic range into a non-linear dynamic range. This companded image data may be expanded by the decompanding module 304 to restore the linear dynamic range. For example, the decompanding module 304 may decompand a 16-bit companded image data into a 24-bit image data with a linear dynamic range. In some cases, the decompanding module 304 may expand the companded signal based on a set of lookup tables (LUTs). The LUTs may include a separate LUT for each color channel (e.g., a red channel LUT, green channel LUT, clear channel LUT, blue channel LUT, etc.) and a LUT for luminance values. In some cases, the decompanding module 304 may use four LUTs for three color channels and a luminance channel.

The LUTs map the companded lower bit values of the image data to higher bit values. In this example, the 16-bit values of the companded signal from the image sensor may be mapped into a 24-bit space using the LUTs. Separate LUTs for each color channel helps allow for per channel nonlinearity correction for the image sensor. In some cases, the LUTs of the decompanding module 304 may be configured/reconfigured by a user, such as an end-user manufacturer. Of note, to help preserve the specific nonlinearity of the companded image data, the tone mapping module of the image processor may be bypassed to help avoid introducing additional nonlinearity into the image data. The decompanding module 304 may output image data with a linear dynamic range to a color correction module 306.

The color correction module 306 may convert color space from the sensor color space to an output color space. For example, the image sensor may sense and map colors in a certain way, forming a color space of the image sensor. As an example, this mapping may be performed using a color correction matrix and an offset vector by multiplying the input color vector (e.g., color values for a pixel) with the color correction matrix and adding the offset. This color space may be converted by mapping the image sensor color space to the desired output color space, and this conversion occurs in a linear space, thus preserving the linear dynamic range. By performing the color conversion in linear space, a more accurate color conversion may be performed as color distortion introduced by converting across nonlinear portions of the color space can be avoided. In some cases, the color space mapping of the color correction module 306 may be configured/reconfigured by a user, such as an end-user manufacturer.

In some cases, the color correction module 306 may determine color values which may not be directly captured by the image sensor. For example, an image sensor may be a RCCB image sensor, capturing clear pixels instead of green. The image data from this image sensor, after interpolation, may include, for a pixel, a clear value, a red value, and a blue value. A green value may be determined by subtracting, for the pixel, the red value and the blue value from the clear value, leaving how much green contributed to the image. An offset may be determined for each channel. In some cases, the offset determined by the color correction module 306 may be separate from offsets determined by the interpolation module 302. The offset determined by the color correction module 306 may be determined in a linear space, while offsets determined by the interpolation module 302 may be determined in a nonlinear space. In some cases, both offsets may be determined in a similar way.

The color correction module 306 may output the color corrected image data to a color compression module 308. The color compression module 308 may encode the higher bit value image data into a lower bit value image data. In this example, the 24-bit image data is converted into a 12-bit image data. In some cases, this compression may be performed by transforming the linear dynamic range of the input image data into a nonlinear dynamic range. The compression may be performed based on a set of LUTs which may map input color values to output color values. The mapping may be nonlinear and vary across different ranges of color values. This compression may be performed on a per channel basis to allow for per color channel nonlinear output color encoding. In some cases, four LUTs may be used, one for each color channel and one for luminance. By converting the higher bit value image data into the lower bit value image data, existing image processing pipeline components may be reused, such as the color conversion module 206 and EE module 208.

Figure 4:
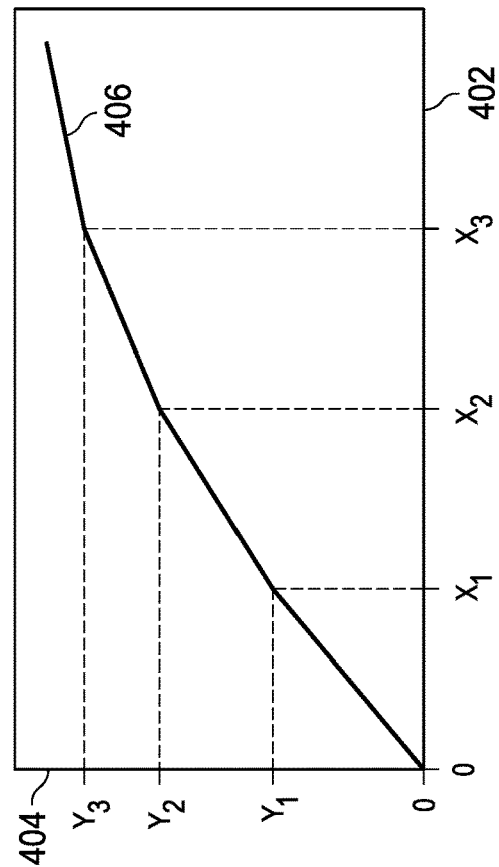
FIG. 4 is a chart plotting mapped values of a Lookup Table (LUT), in accordance with aspects of the present disclosure.

FIG. 4 is a chart 400 plotting mapped values of a LUT, in accordance with aspects of the present disclosure. Chart 400 plots, on the x-axis 402, a set of possible input values. For example, for the decompanding module, possible input color values for a given channel, such as red color channel represented as 16-bit values, may be on the x-axis 402. The Y-axis 404 plots a set of possible mapped values for the input values. Continuing the example for the decompanding module, mapped output color values, such as mapped red color channel values represented as 24-bit values, may be on the y-axis 404. As shown, the mapping may be based on a piecewise linear function with multiple ranges to approximate a translation function that inverts the function used to compand the image data output by the image sensor.

Figure 5:
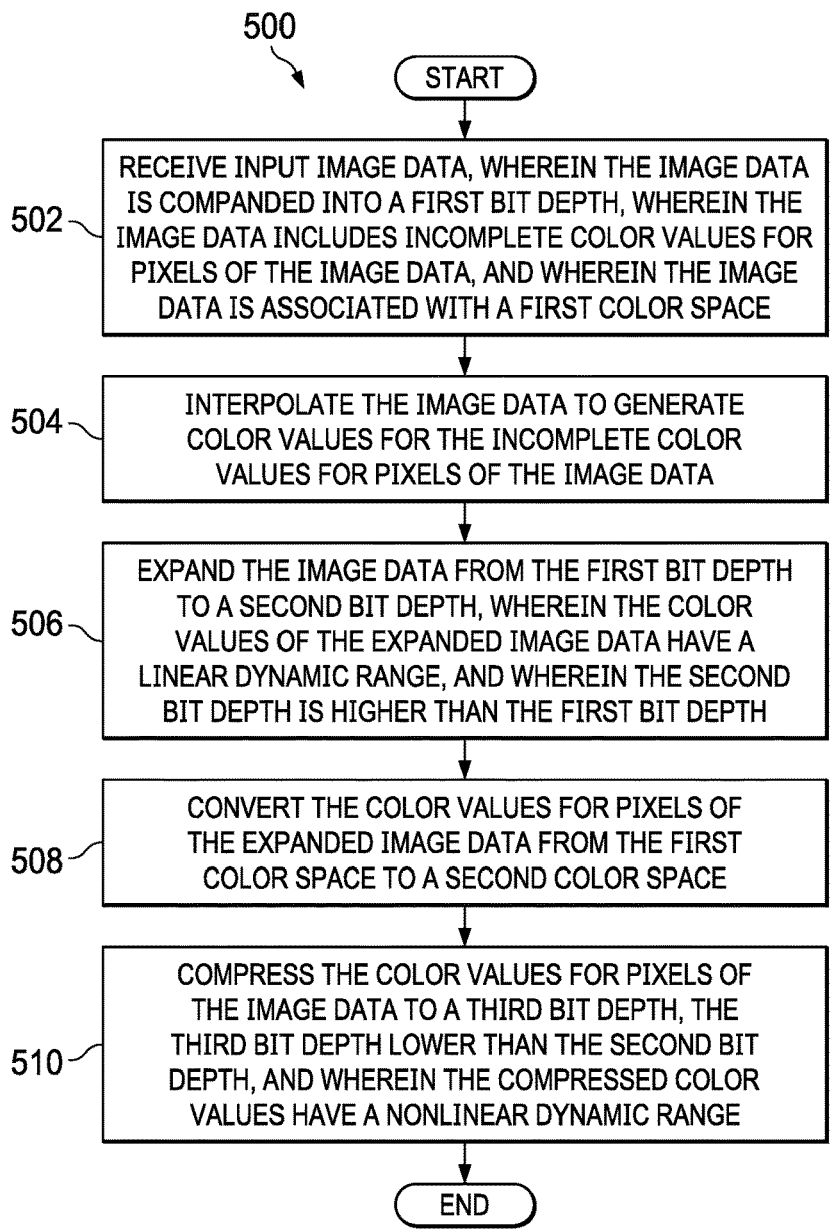
FIG. 5 is a block diagram of an embodiment of an image processing technique, in accordance with aspects of the present disclosure.

FIG. 5 is a block diagram 500 of an embodiment of an image processing technique, in accordance with aspects of the present disclosure. At block 502, input image data is received. The image data is companded into a first bit depth, the image data includes incomplete color values for pixels of the image data, and the image data is associated with a first color space. For example, the image data may be generated by an image sensor based on a set of pixels. The pixels of the image sensor may have a color filter array, which allows each pixel to capture one color of light, such as red, blue, green, clear, etc. The sensitivity of the pixels, colors supported, and levels of color that the pixels can detect and encode (e.g., bit depth) may define a color space of the image sensor. The pixels may capture light based on a linear dynamic range. The image sensor may compand (e.g., compress) the image data from a bit depth captured by the pixels of the image sensor to a lower bit depth for output to an image processor.

At block 504, the image data is interpolated to generate the incomplete color values for pixels of the image data. For example, the image sensor may capture a color value for a single color for each pixel of the image sensor. Pixels of the raw image data then also have a single color value, and interpolation generates the missing color values based on corresponding color values from nearby pixels. At block 506, the image data is expanded from the first bit depth to a second bit depth, where the color values of the expanded image data have a linear dynamic range, and where the second bit depth is higher than the first bit depth. In some cases, the interpolated image data may be decompanded. In some cases, the image data may be decompanded to a bit depth corresponding with the bit depth of the pixels of the image sensor. For example, pixels of the image sensor may be able to generate color values within a 24-bit number space with a linear dynamic range. This 24-bit image data may be companded by the image sensor into a 16-bit number space with a nonlinear dynamic range. A decompanding module may decompand the 16-bit number space and expand the color values back into the 24-bit number space. In some cases, this decompanding may be performed based on one or more LUTs. Values in the one or more LUTs may be described based on a piecewise linear function. The piecewise linear function may include a plurality of linear segments. In some cases, separate LUTs may be used for each color channel.

At block 508, the color values are converted for pixels of the expanded image data from the first color space to a second color space. For example, RCCB color values provided by the image sensor may be converted to RGB color values. This color conversion may be performed in the linear dynamic range to help increase accuracy of the color conversion. At block 510, the color values for pixels of the image data are compressed to a third bit depth, the third bit depth lower than the second bit depth, and where the compressed color values have a nonlinear dynamic range. For example, the color converted image data may be compressed from the 24-bit number space with a linear dynamic range to a 12-bit output number space with a nonlinear dynamic range.

Figure 6:
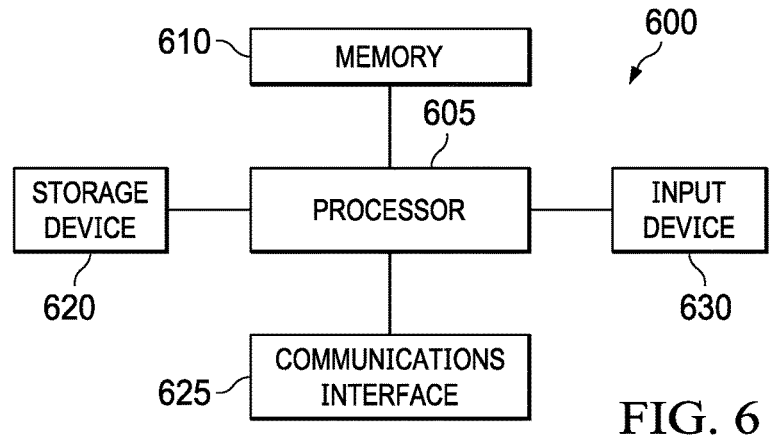
FIG. 6 is a block diagram of an embodiment of a computing device, in accordance with aspects of the present disclosure.

As illustrated in FIG. 6, device 600 includes a processing element such as processor 605 that contains one or more hardware processors, where each hardware processor may have a single or multiple processor cores. Examples of processors include, but are not limited to, a central processing unit (CPU), image processor, or a microprocessor. Although not illustrated in FIG. 6, the processing elements that make up processor 605 may also include one or more other types of hardware processing components, such as graphics processing units (GPUs), application specific integrated circuits (ASICs), field-programmable gate arrays (FPGAs), and/or digital signal processors (DSPs). In certain cases, processor 605 may be configured to perform the tasks described in conjunction with modules 106-112 of the image processor 104 of FIG. 1.

FIG. 6 illustrates that memory 610 may be operatively and communicatively coupled to processor 605. Memory 610 may be a non-transitory computer readable storage medium configured to store various types of data. For example, memory 610 may include one or more volatile devices such as random access memory (RAM), registers, etc. Non-volatile storage devices 620 can include one or more disk drives, optical drives, solid-state drives (SSDs), tap drives, flash memory, electrically erasable programmable read-only memory (EEPROM), and/or any other type memory designed to maintain data for a duration time after a power loss or shut down operation. The non-volatile storage devices 620 may also be used to store programs that are loaded into the RAM when such programs executed.

Persons of ordinary skill in the art are aware that software programs may be developed, encoded, and compiled in a variety of computing languages for a variety of software platforms and/or operating systems and subsequently loaded and executed by processor 605. In one embodiment, the compiling process of the software program may transform program code written in a programming language to another computer language such that the processor 605 is able to execute the programming code. For example, the compiling process of the software program may generate an executable program that provides encoded instructions (e.g., machine code instructions) for processor 605 to accomplish specific, non-generic, particular computing functions.

After the compiling process, the encoded instructions may then be loaded as computer executable instructions or process steps to processor 605 from storage device 620, from memory 610, and/or embedded within processor 605 (e.g., via a cache or on-board ROM). Processor 605 may be configured to execute the stored instructions or process steps in order to perform instructions or process steps to transform the computing device into a non-generic, particular, specially programmed machine or apparatus. Stored data, e.g., data stored by a storage device 620, may be accessed by processor 605 during the execution of computer executable instructions or process steps to instruct one or more components within the computing device 600. Storage device 620 may be partitioned or split into multiple sections that may be accessed by different software programs. For example, storage device 620 may include a section designated for specific purposes, such as storing program instructions or data for updating software of the computing device 600. In one embodiment, the software to be updated includes the ROM, or firmware, of the computing device. In certain cases, the computing device 600 may include multiple operating systems. For example, the computing device 600 may include a general-purpose operating system which is utilized for normal operations. The computing device 600 may also include another operating system, such as a bootloader, for performing specific tasks, such as upgrading and recovering the general-purpose operating system and allowing access to the computing device 600 at a level generally not available through the general-purpose operating system. Both the general-purpose operating system and another operating system may have access to the section of storage device 620 designated for specific purposes.

The one or more communications interfaces 625 may include a radio communications interface for interfacing with one or more radio communications devices. In certain cases, elements coupled to the processor may be included on hardware shared with the processor. For example, the communications interfaces 625, storage device 620, and memory 610 may be included, along with other elements such as the digital radio, in a single chip or package, such as in a system on a chip (SOC). Computing device 600 may also include input and/or output devices, not shown, examples of which include sensors, cameras, human input devices, such as mouse, keyboard, touchscreen, monitors, display screen, tactile or motion generators, speakers, lights, etc. Processed input, for example from the image sensor, may be output from the computing device 600 via the communications interfaces 625 to one or more other devices.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Modifications are possible in the described embodiments, and other embodiments are possible, within the scope of the claims.

What is claimed is:

1. A method, comprising:
   receiving image data having a first bit depth, wherein the image data includes color values captured by pixels of an image sensor corresponding to one or more colors associated with a first color space;
   interpolating the image data to generate color values for one or more colors not captured by the pixels;
   expanding the image data from the first bit depth to a second bit depth that is higher than the first bit depth, wherein color values of the expanded image data have a linear dynamic range;
   converting the color values of the expanded image data from the first color space to a second color space; and
   compressing the color values of the converted image data to a third bit depth that is lower than the second bit depth, wherein the compressed color values have a nonlinear dynamic range.

2. The method of claim 1, wherein the image data is expanded based on one or more lookup tables.

3. The method of claim 2, wherein interpolating the image data comprises generating a plurality of color channels and wherein the image data is expanded based on a separate lookup table for each color channel.

4. The method of claim 1, wherein compressing the color values is based on a separate lookup table for each color channel.

5. The method of claim 4, wherein the lookup tables for the color channels are configurable.

6. The method of claim 1, wherein interpolating the image data comprises generating a plurality of color channels, and wherein interpolating the image data comprises generating a gain value and an offset value for each color channel.

7. The method of claim 6, wherein the color values are converted based in part on the gain value and offset value for each color channel.

8. The method of claim 1, wherein the first bit depth is 16-bit, the second bit depth is 24-bit, and the third bit depth is 12-bit.

9. An image processing pipeline comprising:
a front end module configured to receive image data having a first bit depth, wherein the image data includes color values for a first set of colors associated with a first color space; and
a color processing module including a demosaicing module, the demosaicing module configured to:
  interpolate the image data to generate color values for a second set of colors;
  expand the image data from the first bit depth to a second bit depth that is higher than the first bit depth, wherein color values of the expanded image data have a linear dynamic range;
  convert the color values of the expanded image data from the first color space to a second color space; and
  compress the color values of the image data to a third bit depth that is lower than the second bit depth, wherein the compressed color values have a nonlinear dynamic range.

10. The image processing pipeline of claim 9, wherein to expand the image data, the demosaicing module is configured to expand the image data based on one or more lookup tables.

11. The image processing pipeline of claim 10, wherein to interpolate the image data, the demosaicing module is configured to generate a plurality of color channels, and wherein to expand the image data, the demosaicing module is configured to expand the image data based on a separate lookup table for each color channel.

12. The image processing pipeline of claim 9, wherein to compress the color values, the demosaicing module is configured to compress the color values based on a separate lookup table for each color channel.

13. The image processing pipeline of claim 12, wherein the lookup tables for the color channels are configurable.

14. The image processing pipeline of claim 9, wherein to interpolate the image data, the demosaicing module is configured to generate a plurality of color channels, and a gain value and an offset value for each color channel.

15. A non-transitory program storage device comprising instructions stored thereon to cause one or more processors to:
  receive a set of image data having a first bit depth, wherein the image data includes color values corresponding top a first set of colors associated with a first color space;
  interpolate the image data to generate color values corresponding to a second set of colors;
  expand the image data from the first bit depth to a second bit depth that is higher than the first bit depth, wherein color values of the expanded image data have a linear dynamic range;
  convert the color values of the expanded image data from the first color space to a second color space; and
  compress the color values of the converted image data to a third bit depth that is lower than the second bit depth, wherein the compressed color values have a nonlinear dynamic range.

16. The non-transitory program storage device of claim 15, wherein to expand the image data, the instructions cause the one or more processors to expand the image data based on one or more lookup tables.

17. The non-transitory program storage device of claim 16, wherein to interpolate the image data, the instructions cause the one or more processors to generate a plurality of color channels, and wherein to expand the image data, the instructions cause the one or more processors to expand the image data based on a separate lookup table for each color channel.

18. The non-transitory program storage device of claim 15,
wherein to compress the color values, the instructions cause the one or more processors to compress the color values based on a separate lookup table for each color channel.

19. The non-transitory program storage device of claim 18, wherein the lookup tables for the color channels are configurable.

20. The non-transitory program storage device of claim 15, wherein to interpolate the image data, the instructions cause the one or more processors to generate a plurality of color channels, and a gain value and an offset value for each color channel.

* * * * *